US012301645B2

(12) United States Patent
Wang et al.

(10) Patent No.: US 12,301,645 B2
(45) Date of Patent: May 13, 2025

(54) EFFICIENT ASSOCIATION BETWEEN DASH OBJECTS

(71) Applicant: Huawei Technologies Co., Ltd., Shenzhen (CN)

(72) Inventors: Ye-Kui Wang, San Diego, CA (US); Yuqun Fan, Shenzhen (CN); Peiyun Di, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/938,125

(22) Filed: Jul. 24, 2020

(65) Prior Publication Data

US 2020/0358838 A1 Nov. 12, 2020

Related U.S. Application Data

(63) Continuation of application No. PCT/US2019/024824, filed on Mar. 29, 2019.
(Continued)

(51) Int. Cl.
*H04N 21/65* (2011.01)
*H04L 65/65* (2022.01)
(Continued)

(52) U.S. Cl.
CPC ....... *H04L 65/65* (2022.05); *H04N 21/21805* (2013.01); *H04N 21/2353* (2013.01); *H04N 21/816* (2013.01); *H04N 21/8456* (2013.01)

(58) Field of Classification Search
CPC ...................................................... H04N 21/20
See application file for complete search history.

(56) References Cited

U.S. PATENT DOCUMENTS

| 9,860,293 B2 * | 1/2018 | Thang ................ H04N 21/6125 |
| 2015/0262428 A1 * | 9/2015 | Tatzgern ................ G06F 3/017 |
| | | 345/633 |

(Continued)

FOREIGN PATENT DOCUMENTS

| CN | 105230024 A | 1/2016 |
| CN | 105556976 A | 5/2016 |

(Continued)

OTHER PUBLICATIONS

"Information technology—Coded representation of immersive media—Part 2: Omnidirectional media format," International Standard, ISO/IEC 23090-2, Jan. 2019, 10 pages.
(Continued)

*Primary Examiner* — Mushfikh I Alam
(74) *Attorney, Agent, or Firm* — Conley Rose, P.C.

(57) ABSTRACT

A method mechanism for streaming multi-viewpoint virtual reality (VR) content via Dynamic Adaptive Streaming over Hypertext Transfer Protocol (HTTP) (DASH) is disclosed. The mechanism includes receiving media content including a VR video sequence. A DASH Media Presentation Description (MPD) is generated. The MPD includes an indication specifying that a portion of the media content that is related to a first viewpoint is associated with a timed metadata representation. A request is received from a client for the media content. The DASH MPD, including the indication, is transmitted to the client in response to receiving the request to support communication of the media content to the client.

19 Claims, 9 Drawing Sheets

Related U.S. Application Data

(60) Provisional application No. 62/653,205, filed on Apr. 5, 2018.

(51) Int. Cl.
  *H04N 21/218* (2011.01)
  *H04N 21/235* (2011.01)
  *H04N 21/81* (2011.01)
  *H04N 21/845* (2011.01)

(56) References Cited

U.S. PATENT DOCUMENTS

| | | | |
|---|---|---|---|
| 2016/0255417 A1* | 9/2016 | Yamagishi | H04N 21/8456 725/110 |
| 2017/0339415 A1 | 11/2017 | Wang et al. | |
| 2017/0347026 A1 | 11/2017 | Hannuksela | |
| 2018/0061002 A1* | 3/2018 | Lee | H04N 19/88 |
| 2019/0020863 A1* | 1/2019 | Wang | H04N 13/243 |
| 2019/0158933 A1* | 5/2019 | Ouedraogo | H04N 21/816 |
| 2019/0373245 A1* | 12/2019 | Lee | H04N 21/8456 |
| 2019/0379856 A1* | 12/2019 | Hur | H04N 5/2624 |
| 2020/0053392 A1* | 2/2020 | Hannuksela | H04N 19/31 |
| 2020/0105063 A1* | 4/2020 | Wang | H04N 21/4728 |
| 2021/0029294 A1* | 1/2021 | Deshpande | H04N 23/698 |
| 2021/0058600 A1* | 2/2021 | Deshpande | H04N 13/178 |
| 2021/0377571 A1* | 12/2021 | Deshpande | H04N 19/174 |

FOREIGN PATENT DOCUMENTS

| | | | |
|---|---|---|---|
| CN | 107529064 A | 12/2017 | |
| WO | WO-2017205794 A1 * | 11/2017 | H04N 21/234345 |

OTHER PUBLICATIONS

Zare, A., "HEVC-compliant Viewport-adaptive Streaming of Stereoscopic Panoramic Video," IEEE, Dec. 2016, 5 pages.

Zhang, S., "Quality Information Signalling for DASH using Metadata Track," ISO/IEC JTC1/SC29/WG11 MPEG2013/m30352, Jul. 2013, 6 pages.

"Line Transmission of Non-Telephone Signals Video Codec for Audiovisual Services at px64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services - Coding of moving video; High efficiency video coding" Recommendation ITU-T H.265, Apr. 2013, 317 pages.

"Information technology—Coding of audio-visual objects—Part 12: ISO base media file format," ISO/IEC 14496-12, Fifth Edition, Dec. 15, 2015, 248 pages.

"Information technology—Coding of audio-visual objects—Part 14: MP4 file format," ISO/IEC 14496-14, Second Edition, Nov. 2018, 22 pages.

"Information technology—Coding of audio-visual objects—Part 15: Advanced Video Coding (AVC) file format," ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 16)," 3GPP TS 26.244 V16.1.0, Sep. 2020, 68 pages.

Moats, R., "URN Syntax," RFC 2141, May 1997, 8 pages.

Berners-Lee, T., et al., "Uniform Resource Identifier (URI): Generic Syntax," Network Working Group, RFC 3986, Jan. 2005, 61 pages.

* cited by examiner

EFFICIENT ASSOCIATION BETWEEN DASH OBJECTS

CROSS-REFERENCE TO RELATED APPLICATIONS

This patent application is a continuation of International Application No. PCT/US2019/024824 filed Mar. 29, 2019 by Ye-Kui Wang, et. al., and titled "Efficient Association Between DASH objects," which claims the benefit of U.S. Provisional Patent Application No. 62/653,205, filed Apr. 5, 2018 by Ye-Kui Wang, et. al., and titled "Efficient Association Between Dynamic Adaptive HTTP Streaming (DASH) objects," which are hereby incorporated by reference.

TECHNICAL FIELD

The present disclosure is generally related to Virtual Reality (VR) video systems, and is specifically related to signaling VR video related data via Dynamic Adaptive Streaming over Hypertext transfer protocol (DASH).

BACKGROUND

VR, which may also be known as omnidirectional media, immersive media, and/or three hundred sixty degree media, is an interactive recorded and/or computer-generated experience taking place within a simulated environment and employing visual, audio, and/or haptic feedback. For a visual perspective, VR provides a sphere (or sub-portion of a sphere) of imagery with a user positioned at the center of the sphere. The sphere of imagery can be rendered by a head mounted display (HMD) or other display unit. Specifically, a VR display allows a user to view a sub-portion of the sphere through a field of view (FOV), which is also known as a viewport. The user can dynamically change the position and/or angle of the viewport to experience the environment presented by the VR video. Each picture, also known as a frame, of the VR video includes both the area of the sphere inside the user's FOV and the area of the sphere outside the user's FOV. Hence, a VR frame includes significantly more data than a non-VR video image. Content providers are interested in providing VR video on a streaming basis. However, VR video includes significantly more data and different attributes than traditional video. As such, streaming mechanisms for traditional video are not designed to efficiently stream VR video.

SUMMARY

In an embodiment, the disclosure includes a method implemented in a Dynamic Adaptive Streaming over Hypertext Transfer Protocol (HTTP) (DASH) content server. The method comprises receiving, by a receiver, media content including a virtual reality (VR) video sequence, the media content comprising a plurality of viewpoints, and the media content also including a timed metadata representation. The method further comprises generating, by a processor, a DASH Media Presentation Description (MPD) including an indication specifying that a portion of the media content that belongs to a first viewpoint is associated with the timed metadata representation. The method further comprises receiving, by the receiver, a request from a client for the media content. The method further comprises transmitting, by a transmitter of the DASH content server, the DASH MPD including the indication to the client in response to receiving the request to support communication of the media content to the client. In some DASH systems a representation level element called an association identifier (ID) is used to associate a first DASH representation with a second DASH representation. For instance, a representation of a video track may use the association ID to reference an audio track. Each representation would contain such an association ID. This scheme may not scale well in order to function in a VR context. For example, the VR video could be filmed for multiple viewpoints. Each viewpoint would contain one or more adaptation sets. The adaptation sets then contain various representations. These representations then use the association ID to reference a timed metadata representation (e.g., track) that carries a recommended viewpoint. In this case, every representation in every adaptation set may reference the same timed metadata representation, which makes for a very large listing of redundant association IDs for the timed metadata representation. The present embodiment employs an indication that can be employed to reference larger sets than a representation to representation indication. Specifically, a portion of the media content that belongs to a viewpoint indicates an association with a timed metadata representation.

Optionally, in any of the preceding aspects, another implementation of the aspect provides, wherein the indication is an association ID that is a representation attribute that associates a list of one or more of the adaptation sets to the timed metadata representation. In this embodiment, the indication is an association ID that references an entire adaptation set to the timed metadata representation.

Optionally, in any of the preceding aspects, another implementation of the aspect provides, wherein the indication is an association ID that is a representation attribute that associates a list of one or more of the plurality of viewpoints to the timed metadata representation. In this embodiment, the indication is an association ID that references an entire viewpoint to the timed metadata representation.

Optionally, in any of the preceding aspects, another implementation of the aspect provides, wherein the indication is an association ID that is a representation attribute that associates a list of one or more preselections to the timed metadata representation. In this embodiment, the indication is an association ID that references an entire preselection of viewpoints and/or adaptation sets to the timed metadata representation.

Optionally, in any of the preceding aspects, another implementation of the aspect provides, wherein the indication is an association identifier (ID) that is a representation attribute, an adaptation set attribute, a preselection attribute, a viewpoint element attribute, or combinations thereof.

Optionally, in any of the preceding aspects, another implementation of the aspect provides, wherein the indication is an association ID that is an attribute indicating that the association ID references a unique ID attribute amongst IDs for the plurality of adaptation sets describing the media content and IDs for representations associated with the plurality of adaptation sets.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform any of the methods described above.

In an embodiment, the disclosure includes a DASH content server comprising a receiver, a transmitter, and a processor coupled to the receiver and the transmitter, the processor configured to perform any of the methods described above.

In an embodiment, the disclosure includes a DASH content server comprising a content receiving means for receiving media content including a VR video sequence, the media content comprising a plurality of viewpoints, and the media content also including a timed metadata representation. The DASH content server also includes a DASH MPD generation means for generating a DASH MPD including an indication specifying that a portion of the media content that belongs to a first viewpoint is associated with the timed metadata representation. The DASH content server also includes a request receiving means for receiving a request from a client for the media content. The DASH content server also includes a transmitting means for transmitting the DASH MPD including the indication to the client in response to receiving the request to support communication of the media content to the client.

Optionally, in any of the preceding aspects, another implementation of the aspect provides, wherein the DASH MPD means is further configured to any of the methods described above.

In an embodiment, the disclosure includes a method implemented in a DASH client. The method comprises receiving, by a receiver, a DASH MPD. The MPD describes a media content including a VR video sequence comprising a plurality of viewpoints, and the media content also including a timed metadata representation, the MPD also including an indication specifying that a portion of the media content that belongs to a first viewpoint is associated with one of the timed metadata representation. The method also includes transmitting, by a transmitter, a request for the portion of the media content that belongs to the first viewpoint and a request for the one of the timed metadata representation based on the indication. The method also includes receiving, by a receiver, the portion of the media content that belongs to the first viewpoint and the timed metadata representation. In some DASH systems a representation level element called an association identifier (ID) is used to associate a first DASH representation with a second DASH representation. For instance, a representation of a video track may use the association ID to reference an audio track. Each representation would contain such an association ID. This scheme may not scale well in order to function in a VR context. For example, the VR video could be filmed for multiple viewpoints. Each viewpoint would contain one or more adaptation sets. The adaptation sets then contain various representations. These representations then use the association ID to reference a timed metadata representation (e.g., track) that carries a recommended viewpoint. In this case, every representation in every adaptation set may reference the same timed metadata representation, which makes for a very large listing of redundant association IDs for the timed metadata representation. The present embodiment employs an indication that can be employed to reference larger sets than a representation to representation indication. Specifically, a portion of the media content that belongs to a viewpoint indicates an association with a timed metadata representation.

Optionally, in any of the preceding aspects, another implementation of the aspect provides, wherein the indication is an association identifier (ID) that is a representation attribute that associates a list of one or more of the adaptation sets to the timed metadata representation. In this embodiment, the indication is an association ID that references an entire adaptation set to the timed metadata representation.

Optionally, in any of the preceding aspects, another implementation of the aspect provides, wherein the indication is an association identifier (ID) that is a representation attribute that associates a list of one or more of the plurality of viewpoints to the one of the timed metadata representation. In this embodiment, the indication is an association ID that references an entire viewpoint to the timed metadata representation.

Optionally, in any of the preceding aspects, another implementation of the aspect provides, wherein the indication is an association identifier (ID) that is a representation attribute that associates a list of one or more preselections to the timed metadata representation. In this embodiment, the indication is an association ID that references an entire preselection of viewpoints and/or adaptation sets to the timed metadata representation.

Optionally, in any of the preceding aspects, another implementation of the aspect provides, wherein the indication is an association identifier (ID) that is a representation attribute, an adaptation set attribute, a preselection attribute, a viewpoint element attribute, or combinations thereof.

Optionally, in any of the preceding aspects, another implementation of the aspect provides, wherein the indication is an association ID that is an attribute indicating that the association ID references a unique ID attribute amongst IDs for the plurality of adaptation sets describing the media content and IDs for representations associated with the plurality of adaptation sets.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform any of the methods described above.

In an embodiment, the disclosure includes a DASH client comprising: a receiver; a transmitter; and a processor coupled to the receiver and the transmitter, the processor configured to perform any of the methods described above.

In an embodiment, the disclosure includes a DASH client comprising a MPD receiving means for receiving a DASH MPD, the MPD describing a media content including a VR video sequence comprising a plurality of viewpoints, and the media content also including a timed metadata representation, the MPD also including an indication specifying that a portion of the media content that belongs to a first viewpoint is associated with the timed metadata representation. The DASH client also includes a transmitting means for transmitting a request for the portion of the media content that belongs to the first viewpoint and a request for the timed metadata representation based on the indication. The DASH client also includes a media content receiving means for receiving the portion of the media content that belongs to the first viewpoint and the timed metadata representation.

Optionally, in any of the preceding aspects, another implementation of the aspect provides, wherein the DASH MPD means is further configured to perform any of the methods described above.

In an embodiment, the disclosure includes a method comprising associating a timed metadata representation with media representations in a DASH MPD through collective association by including an association descriptor in an element of the timed metadata representation, the association descriptor including an association to a viewpoint including the media representations.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
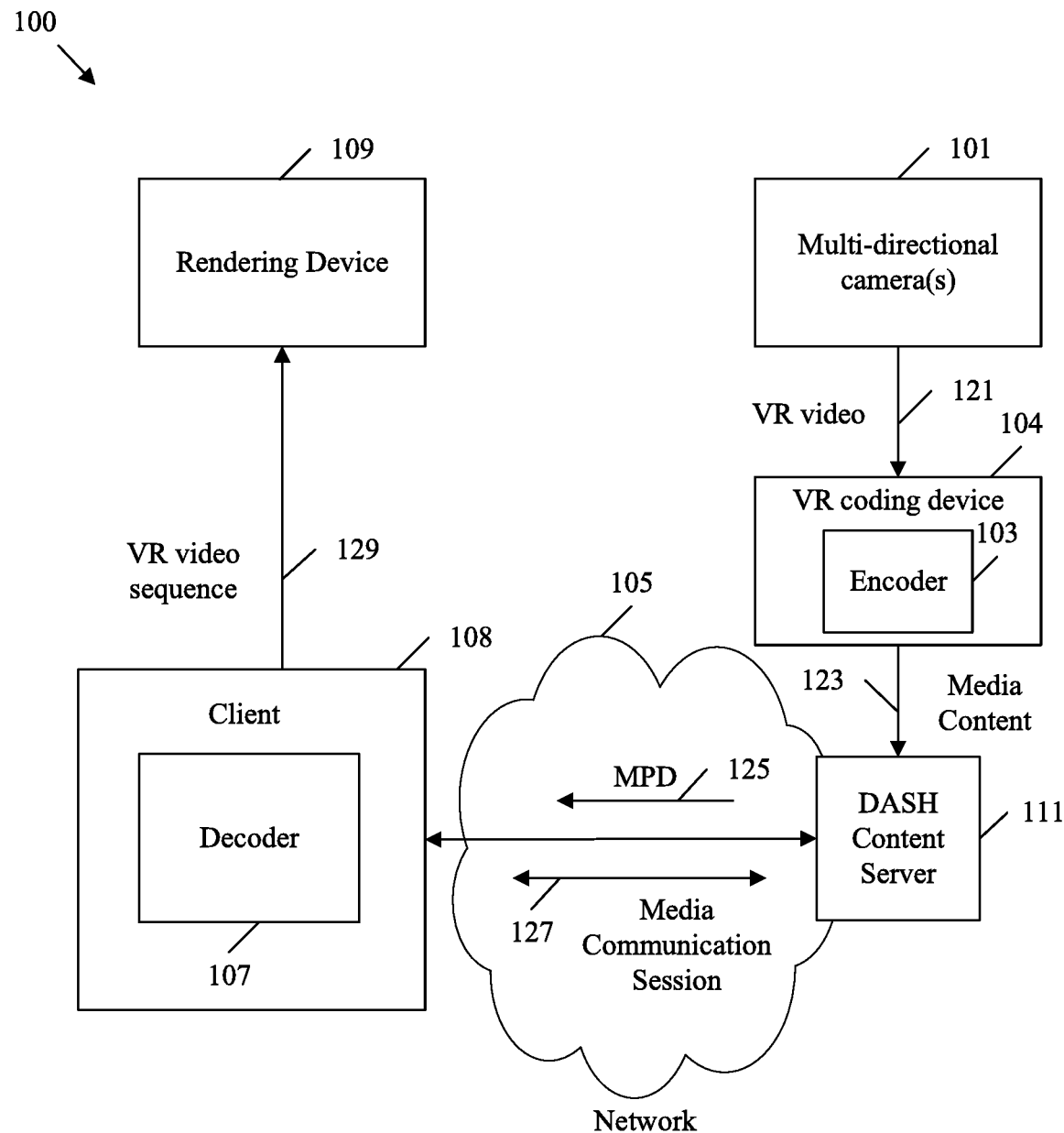
FIG. 1 is a schematic diagram of an example system for VR based video streaming.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

DASH is a mechanism for streaming video data across a network. DASH provides a Media Presentation Description (MPD) file that describes a video to a client. Specifically, a MPD describes various representations of a video as well as the location of such representations. The representations may include the same video content at different resolutions. The client can obtain video segments from the representations for display to the client. Specifically, the client can monitor the video buffer and/or network communication speed and dynamically change video resolution based on current conditions by switching between representations based on data in the MPD.

DASH allows representations to be associated with other representations. For example, video representations can be associated with representations that include timed metadata. Such metadata may provide data indicating how video frames should be presented. Such data may be referred to as hints and the representation may be referred to as a hint track. In DASH, each representation can be associated with the representation containing the relevant hint track. Applying such a scheme to VR video may be problematic. For example, a VR video can include multiple video streams simultaneously captured from multiple positions, known as viewpoints. During playback, a user can view video from a viewpoint by looking in a specified direction. Specifically, a directional viewing angle that points outward from the center of a viewpoint and that defines viewable media content seen by the user is known as a FOV. A viewable area of the media content that can be seen by the user at a corresponding viewpoint and FOV is known as a viewport (e.g., viewport and FOV may be used interchangeably in many contexts). A user can be allowed to swap between viewpoints during the course of the video. Each viewpoint includes a plurality of representations. A timed metadata representation may contain a recommended viewpoint, viewport, and/or FOV at any specified point in time. This allows the user the option of relinquishing control of the VR experience (e.g., in case the user wishes to allow the content producer to determine where to look). In order to implement this scheme, every representation from every viewpoint is associated with the timed metadata representation. This allows the decoder to determine the recommended viewpoint, viewport, and/or FOV at any time regardless of which representation is currently being presented to the user. When a large number of representations are present, this approach results in a large MPD as each association is recorded for each representation.

Further, viewpoints in DASH can be identified based on a viewpoint identifier (ID) and/or position data. In some cases, a viewpoint may change position over time. For example, a camera can be mounted on a rail and move to capture different areas of the recorded environment. In this case, the position information changes. DASH mechanisms may be unable to clearly determine that certain elements are associated with the same viewpoint due to differing position information for the viewpoint at different times.

Disclosed herein are mechanisms to allow a DASH MPD to efficiently represent VR video with multiple and/or moving viewpoints. To solve the first problem discussed above, association ID attributes are introduced that allow DASH objects to refer to other DASH objects at different levels of specificity (e.g., beyond a strict representation to representation association). For example, DASH organizes representations into adaptation sets, where an adaptation set contains representations that are interchangeable at run time (e.g., representations containing the same video data at different resolutions). When different viewpoints are employed, each viewpoint may include one or more adaptation sets with one or more corresponding representations. Further, a MPD can contain preselections, which are a combination of adaptation sets that form a specific experience and are selected by a content provider to be rendered as a group (e.g., an audio track adaptation set and a video adaptation set associated with a common viewpoint). The association IDs disclosed herein can associate representations to adaptation sets, representations to viewpoints, representations to preselections, adaptation sets to viewpoints, adaptation sets to preselections, viewpoints to preselections, vice versa, and any combination or sub-combination thereof. For example, the association IDs can include an association ID (@associationId) attribute, an association by viewpoint ID (@association- VwptId) attribute, an association by adaptation set ID (@associationAsId), an association by preselection ID (@associationPsId), or combinations thereof. The second problem is solved by considering viewpoint elements as equivalent when viewpoint IDs are equivalent, regardless of viewpoint position information.

FIG. 1 is a schematic diagram of an example system 100 for VR based video streaming. System 100 includes a multi-directional camera 101, a VR coding device 104 including an encoder 103, a DASH content server 111, a client 108 with a decoder 107, and a rendering device 109. The multi-directional camera 101 comprises an array of camera devices. Each camera device is pointed at a different angle so that the multi-directional camera 101 can take multiple directional video streams of the surrounding environment from a plurality of angles. For example, multi-directional camera 101 can take VR video 121 of the environment as a sphere with the multi-directional camera 101 at the center of the sphere. As used herein, sphere and spherical video refers to both a geometrical sphere and sub-portions of a geometrical sphere, such as spherical caps, spherical domes, spherical segments, etc. For example, a multi-directional camera 101 may take a one hundred and eighty degree video to cover half of the environment so that a production crew can remain behind the multi-directional camera 101. A multi-directional camera 101 can also take VR video 121 in three hundred sixty degrees (or any sub-portion thereof). However, a portion of the floor under the multi-directional camera 101 may be omitted, which results in video of less than a perfect sphere. Hence, the term sphere, as used herein, is a general term used for clarity of discussion and should not be considered limiting from a geometrical stand point. It should be noted that multi-directional camera 101 as described is an example camera capable of capturing VR video 121, and that other camera devices may also be used to capture VR video (e.g., a camera, a fisheye lens).

The VR video 121 from the multi-directional camera 101 is forwarded to the VR coding device 104. The VR coding device 104 may be a computing system including specialized VR coding software. The VR coding device 104 may include an encoder 103. In some examples, the encoder 103 can also be included in a separate computer system from the VR coding device 104. The VR coding device 104 is configured to convert the multiple directional video streams in the VR video 121 into a single multiple directional video stream including the entire recorded area from all relevant angles. This conversion may be referred to as image stitching. For example, frames from each video stream that are captured at the same time can be stitched together to create a single spherical image. A spherical video stream can then be created from the spherical images. For clarity of discussion, it should be noted that the terms frame, picture, and image may be used interchangeably herein unless specifically noted.

The spherical video stream can then be forwarded to the encoder 103 for compression. An encoder 103 is a device and/or program capable of converting information from one format to another for purposes of standardization, speed, and/or compression. Standardized encoders 103 are configured to encode rectangular and/or square images. Accordingly, the encoder 103 is configured to map each spherical image from the spherical video stream into a plurality of rectangular sub-pictures. The sub-pictures can then be placed in separate sub-picture video streams. As such, each sub-picture video stream displays a stream of images over time as recorded from a sub-portion of the spherical video stream. The encoder 103 can then encode each sub-picture video stream to compress the video stream to a manageable file size. In general, the encoder 103 partitions each frame from each sub-picture video stream into pixel blocks, compresses the pixel blocks by inter-prediction and/or intra-prediction to create coding blocks including prediction blocks and residual blocks, applies transforms to the residual blocks for further compression, and applies various filters to the blocks. The compressed blocks as well as corresponding syntax are stored in bitstream(s), for example as tracks in International Standardization Organization base media file format (ISOBMFF) and/or in omnidirectional media format (OMAF).

The encoded tracks from the VR video 121, including the compressed blocks and associated syntax, form part of the media content 123. The media content 123 may include encoded video files, encoded audio files, combined audio video files, media represented in multiple languages, subtitled media, metadata, or combinations thereof. The media content 123 can be separated into adaptation sets. For example, video from a viewpoint can be included in an adaptation set, audio can be included in another adaptation set, closed captioning can be included in another adaptation set, metadata can be included into another adaptation set, etc. Adaptation sets contain media content 123 that is not interchangeable with media content 123 from other adaptation sets. The content in each adaptation set can be stored in representations, where representations in the same adaptation set are interchangeable. For example, VR video 121 from a single viewpoint can be downsampled to various resolutions and stored in corresponding representations. As another example, audio (e.g., from a single viewpoint) can be downsampled to various qualities, translated into different languages, etc. and stored in corresponding representations.

The media content 123 can be forwarded to a DASH content server 111 for distribution to end users over a network 105. The DASH content server 111 may be any device configured to serve HyperText Transfer Protocol (HTTP) requests from a client. The DASH content server 111 may comprise a dedicated server, a server cluster, a virtual machine (VM) in a cloud computing environment, or any other suitable content management entity. The DASH content server 111 may receive media content 123 from the VR coding device 104. The DASH content server 111 may generate an MPD 125 describing the media content 123. For example, the MPD 125 can describe preselections, viewpoints, adaptation sets, representations, metadata tracks, segments thereof, etc. as well as locations where such items can be obtained via a HTTP request (e.g., a HTTP GET).

A client 108 with a decoder 107 may enter a media communication session 127 with the DASH content server 111 to obtain the media content 123 via a network 105, which may include the Internet, a mobile telecommunications network (e.g., a long term evolution (LTE) based data network), or other data communication data system. The client 108 may be any user operated device for viewing video content from the media content 123, such as a computer, television, tablet device, smart phone, etc. The media communication session 127 may include making a media request, such as a HTTP based request (e.g., an HTTP GET request). In response to receiving an initial media request, the DASH content server 111 can forward the MPD 125 to the client 108. The client 108 can then employ the information in the MPD 125 to make additional media requests for the media content 123 as part of the media communication session. Specifically, the client 108 can employ the data in the MPD 125 to determine which portions of the media content 123 should be obtained, for example based on user preferences, user selections, buffer/network conditions, etc. Upon selecting the relevant portions of the media content 123, the client 108 uses the data in the MPD 125 to address the media request to the location at the DASH content server 111 that contains the relevant data. The DASH content server 111 can then respond to the client 108 with the requested portions of the media content 123. In this way, the client 108 receives requested portions of the media content 123 without having to download the entire media content 123, which saves network resources (e.g., time, bandwidth, etc.) across the network 105.

The decoder 107 is a device at the user's location (e.g., implemented on the client 108) that is configured to reverse the coding process of the encoder 103 to decode the encoded bitstream(s) obtained in representations from the DASH content server 111. The decoder 107 also merges the resulting sub-picture video streams to reconstruct a VR video sequence 129. The VR video sequence 129 contains the portion of the media content 123 as requested by the client 108 based on user selections, preferences, and/or network conditions and as reconstructed by the decoder 107. The VR video sequence 129 can then be forwarded to the rendering device 109. The rendering device 109 is a device configured to display the VR video sequence 129 to the user. For example, the rendering device 109 may include an HMD that is attached to the user's head and covers the user's eyes. The rendering device 109 may include a screen for each eye, cameras, motion sensors, speakers, etc. and may communicate with the client 108 via wireless and/or wired connections. In other examples, the rendering device 109 can be a display screen, such as a television, a computer monitor, a tablet personal computer (PC), etc. The rendering device 109 may display a sub-portion of the VR video sequence 129 to the user. The sub-portion shown is based on the FOV and/or viewport of the rendering device 109. For example, the rendering device 109 may change the position of the FOV based on user head movement by employing the motion tracking sensors. This allows the user to see different portions of the spherical video stream depending on head movement. In some cases, the rendering device 109 may offset the FOV for each eye based on the user's interpupillary distance (IPD) to create the impression of a three dimensional space.

Figure 2:
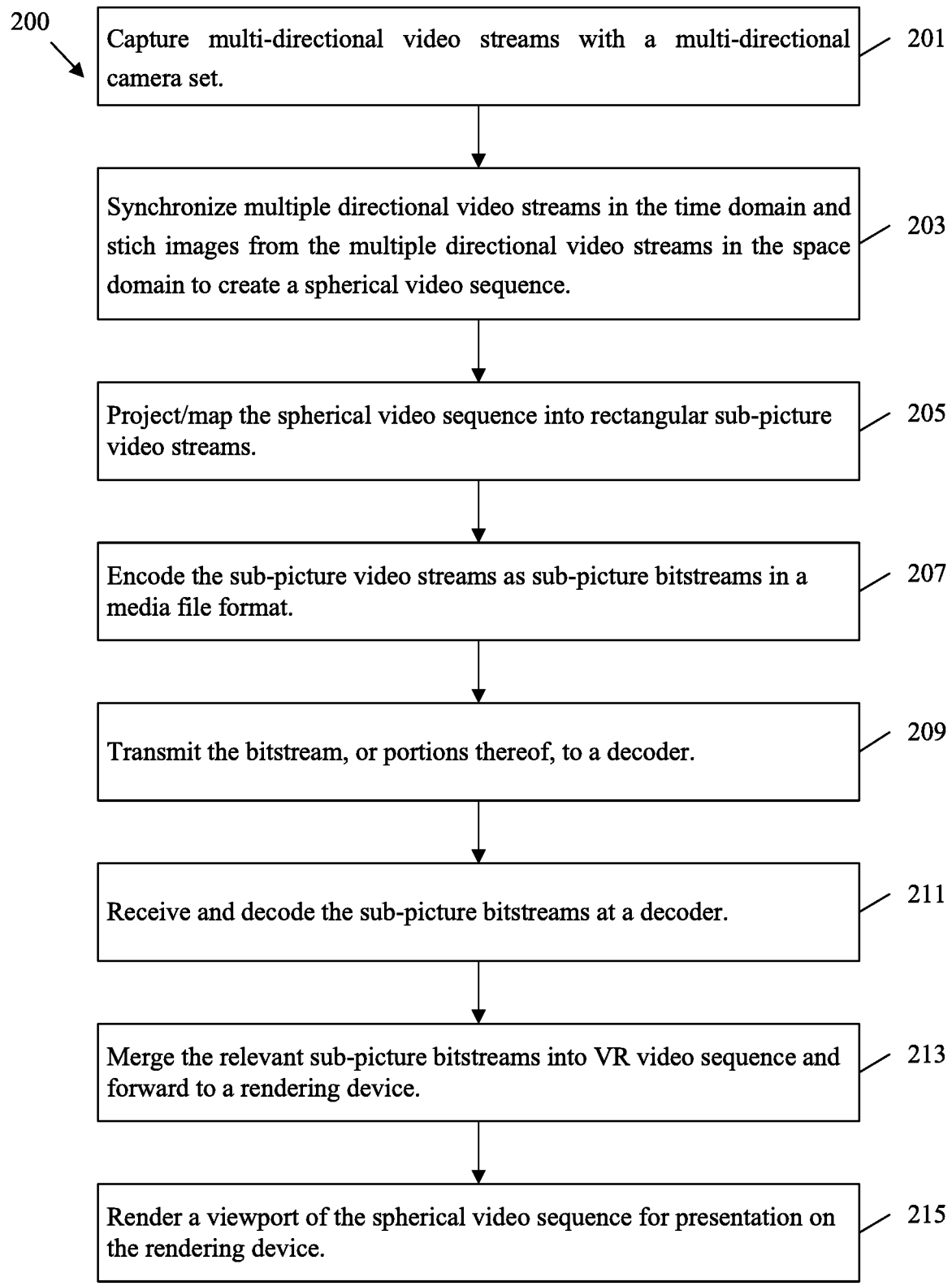
FIG. 2 is a flowchart of an example method of coding a VR video.

FIG. 2 is a flowchart of an example method 200 of coding a VR video, for example by employing the components of system 100. At step 201, a multi-directional camera set, such as multi-directional camera 101, is used to capture multiple directional video streams. The multiple directional video streams include views of an environment at various angles. For example, the multiple directional video streams may capture video from three hundred sixty degrees, one hundred eighty degrees, two hundred forty degrees, etc. around the camera in the horizontal plane. The multiple directional video streams may also capture video from three hundred sixty degrees, one hundred eighty degrees, two hundred forty degrees, etc. around the camera in the vertical plane. The result is to create video that includes information sufficient to cover a spherical area around the camera over some period of time.

At step 203, the multiple directional video streams are synchronized in the time domain. Specifically, each directional video stream includes a series of images taken at a corresponding angle. The multiple directional video streams are synchronized by ensuring frames from each directional video stream that were captured at the same time domain position are processed together. The frames from the directional video streams can then be stitched together in the space domain to create a spherical video stream. Hence, each frame of the spherical video stream contains data taken from the frames of all the directional video streams that occur at a common temporal position.

At step 205, the spherical video stream is mapped into rectangular sub-picture video streams. This process may also be referred to as projecting the spherical video stream into rectangular sub-picture video streams. Encoders and decoders are generally designed to encode rectangular and/or square frames. Accordingly, mapping the spherical video stream into rectangular sub-picture video streams creates video streams that can be encoded and decoded by non-VR specific encoders and decoders, respectively. It should be noted that steps 203 and 205 are specific to VR video processing, and hence may be performed by specialized VR hardware, software, or combinations thereof.

At step 207, the rectangular sub-picture video streams making up the VR video can be forwarded to an encoder, such as encoder 103. The encoder then encodes the sub-picture video streams as sub-picture bitstreams in a corresponding media file format. Specifically, each sub-picture video stream can be treated by the encoder as a video signal. The encoder can encode each frame of each sub-picture video stream via inter-prediction, intra-prediction, etc. Regarding file format, the sub-picture video streams can be stored in ISOBMFF. For example, the sub-picture video streams are captured at a specified resolution. The sub-picture video streams can then be downsampled to various lower resolutions for encoding. Each resolution can be referred to as a representation. Lower quality representations lose image clarity while reducing file size. Accordingly, lower quality representations can be transmitted to a user using fewer network resources (e.g., time, bandwidth, etc.) than higher quality representations with an attendant loss of visual quality. Each representation can be stored in a corresponding set of tracks at a DASH content server, such as DASH content server 111. Hence, tracks can be sent to a user, where the tracks include the sub-picture bitstreams at various resolutions (e.g., visual quality).

At step 209, the sub-picture bitstreams can be sent to the decoder as tracks. Specifically, an MPD describing the various representations can be forwarded to the client from the DASH content server. This can occur in response to a request from the client, such as an HTTP GET request. For example, the MPD may describe various adaptation sets containing various representations. The client can then request the relevant representations, or portions thereof, from the desired adaptation sets.

At step 211, a decoder, such as decoder 107, receives the requested representations containing the tracks of sub-picture bitstreams. The decoder can then decode the sub-picture bitstreams into sub-picture video streams for display. The decoding process involves the reverse of the encoding process (e.g., using inter-prediction and intra-prediction). Then, at step 213, the decoder can merge the sub-picture video streams into the spherical video stream for presentation to the user as a VR video sequence. The decoder can then forward the VR video sequence to a rendering device, such as rendering device 109.

At step 215, the rendering device renders a viewport of the spherical video stream for presentation to the user. As mentioned above, areas of the VR video sequence outside of the FOV at each point in time are not rendered.

Figure 3:
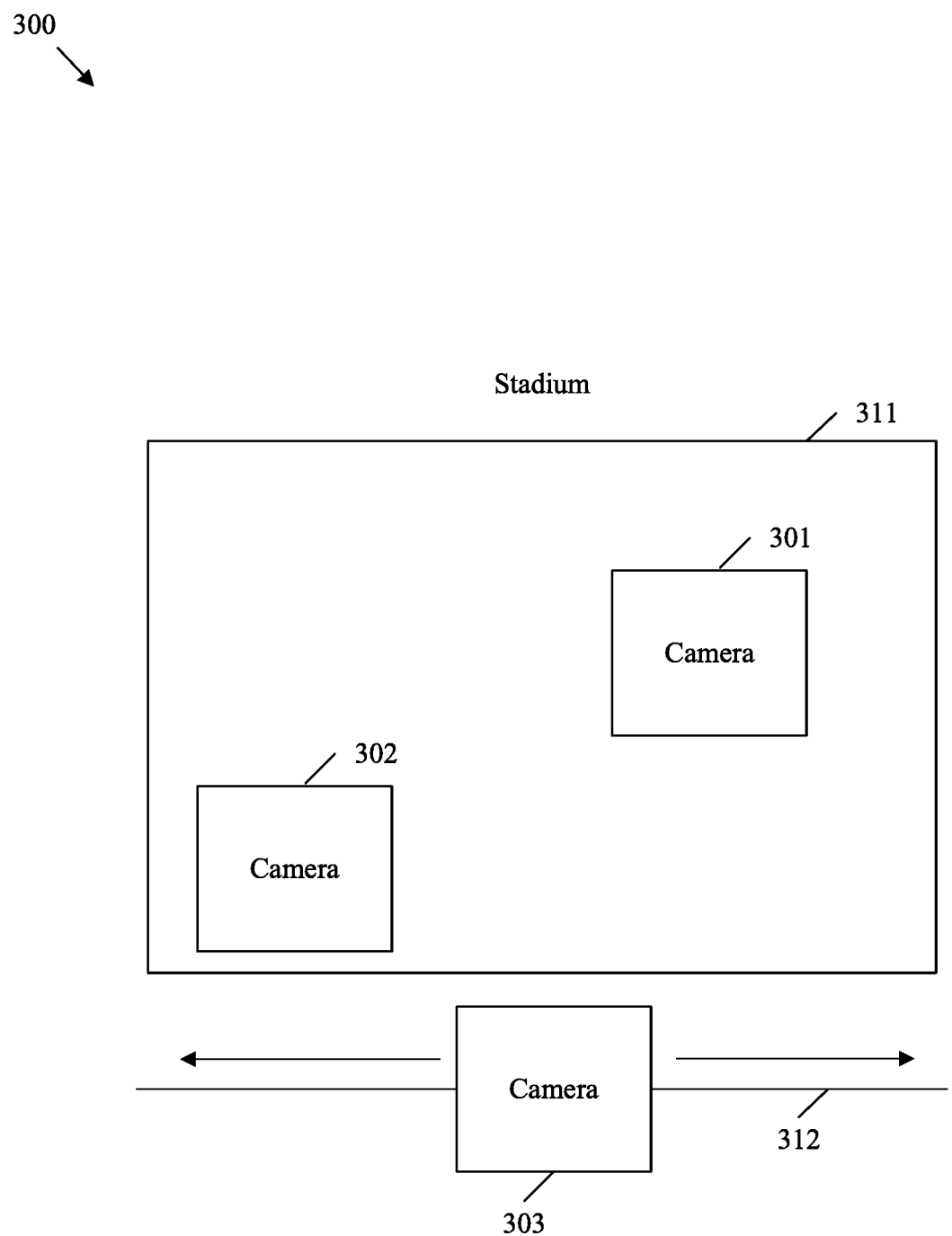
FIG. 3 is a schematic diagram of an example system for recording VR based video with multiple viewpoints.

FIG. 3 is a schematic diagram of an example system 300 for recording VR based video with multiple viewpoints. For example, system 300 can be employed to record VR video from a plurality of viewpoints. The video from each viewpoint can be stored separated into one or more adaptation sets, and then stored as representations of the corresponding adaptation set(s). Such adaptation sets and representations can be encoded and transmitted to the client for rendering, for example as discussed with respect to system 100 and/or method 200. Hence, system 300 can act as an embodiment of multi-directional cameras 101.

In an example, system 300 may be deployed in a stadium 311 hosting a sporting event. System 300 may employ a first stationary camera 301, a second stationary camera 302, and a mobile camera 303. Cameras 301-303 can be multi-directional cameras for recording VR sequences in some examples. Camera 301 is stationed at a first viewpoint and camera 302 is stationed at a second viewpoint that is different from the first viewpoint. Over the course of a sporting event in the stadium 311, camera 301 and camera 302 record the same environment from different viewpoints and hence provide different perspectives of the actions occurring during the sporting event in the stadium 311. Camera 303 may move as directed by stadium 311 staff. For example, camera 303 may be positioned on a rail 312 and may move to areas of particular interest over the course of the sporting event. For example, camera 303 can be moved adjacent to the location of a ball as the sporting event progresses in order to provide the best view of a game being played. Accordingly, camera 303 is associated with a changing viewpoint that is different from the viewpoints of cameras 301 and 302.

In an example, the video from the various cameras 301-303 can be provided in a manner that would allow a user to dynamically select a video stream from a corresponding viewpoint on demand. In a DASH scheme, the video and/or audio from each camera 301-303 can be saved in corresponding adaptation set(s) based on viewpoint. The video from each adaptation set corresponding to a viewpoint can be stored in representations of various qualities. Hence, a user can select a viewpoint based on data from an MPD and receive a representation of video from the viewpoint at a video quality that is appropriate for the user's network connection.

Further, a user may wish to relinquish control and allow a video producer to select the most relevant viewpoint as the sporting event progresses. This can be accomplished by employing a timed metadata track (e.g., a hint track). The time metadata track is stored as a separate representation in a separate adaptation set. For example, the time metadata track can indicate that a specified FOV at the viewpoint of camera 301 contains the most interesting video (e.g., a player carrying a ball) at a first time period, indicate a FOV at the viewpoint of camera 302 at a second time period, indicate a FOV at the viewpoint of camera 303 at a third time period, etc. In this manner, a client can read the timed metadata track and obtain an appropriate representation from the viewpoint indicated by the timed metadata track for display to the user over the course of the sporting event as directed by a video producer.

In this scenario, every representation at every viewpoint (e.g., at every adaptation set) is associated with the timed metadata track. When many viewpoints and many video qualities are employed, the number of associations between the timed metadata track and the corresponding representations becomes significant. Such associations are noted in the MPD file, which may substantially increase the file size of the MPD file. Accordingly, the present disclosure describes mechanisms to denote associations between various DASH objects in addition to a representation to representation association. For example, the viewpoints of the three cameras 301-303 can be associated with the timed metadata track representation and/or adaptation set. This reduces the number of associations from three times the number of available video qualities to three in the example depicted. Various DASH objects and associations between such objects to address these issues are discussed with respect to the FIGs. below.

Figure 4:
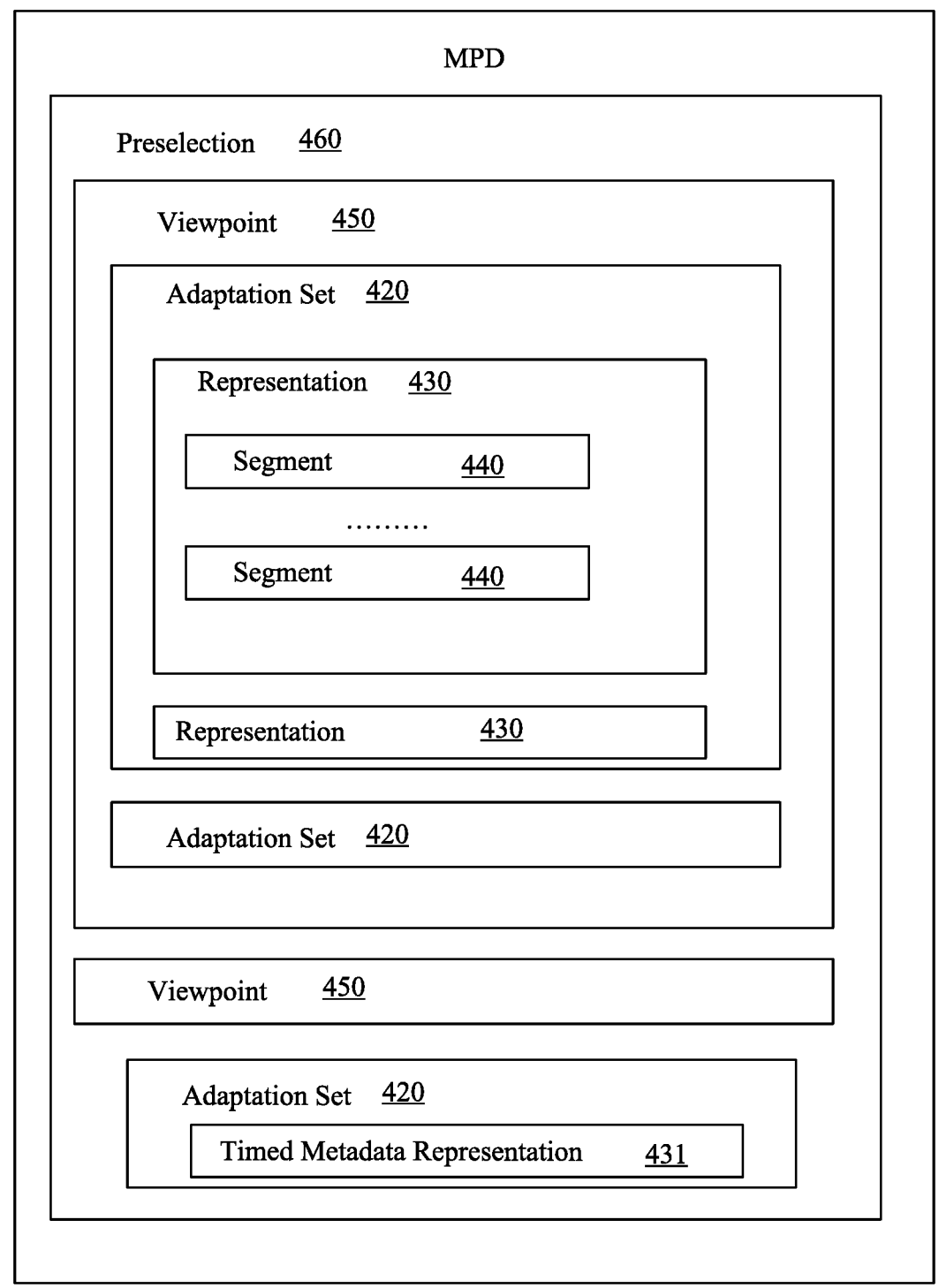
FIG. 4 is a schematic diagram of an example DASH Media Presentation Description (MPD) that may be employed for streaming VR video with multiple viewpoints.

FIG. 4 is a schematic diagram of an example DASH MPD 400 that may be employed for streaming VR video with multiple viewpoints. For example, MPD 400 can be used to describe video recorded by system 300 when applying method 200 and/or system 100. Hence, MPD 400 can be used as an MPD 125.

MPD 400 can include one or more preselections 460. A preselection 460 is a grouping of content that is selected (e.g., by a video producer) to be experienced together. For example, a preselection 460 may include video, corresponding audio, corresponding sub-titles, corresponding haptic feedback, etc. For example, a preselection 460 can include a plurality of adaptation sets 420.

The MPD 400 can also include one or more viewpoints 450. A viewpoint 450 includes adaptation sets 420 that are associated with (e.g., recorded from) a common position/camera. For example, a viewpoint 450 may include any version of data recorded completely from camera 301 (a first viewpoint 450), completely from camera 302 (a second viewpoint 450), or completely from camera 303 (a third viewpoint 450). A viewpoint 450 may include one or more adaptation sets 420. For example, a viewpoint 450 may include an adaptation set 420 for audio recorded at a position, an adaptation set 420 for video at the position, an adaptation set 420 for metadata related to the position, etc. A viewpoint 450 may or may not be part of a preselection 460, depending on choices made by a content producer.

An adaptation set 420 contains one or more representations 430. Specifically, an adaptation set 420 contains representations 430 that are of a common type and that can be rendered interchangeably. For example, audio data, video data, and metadata would be positioned in different adaptation sets 420 as a type of audio data cannot be swapped with a type of video data without effecting the media presentation. Further, video from different viewpoints 450 are not interchangeable as such videos contain different images.

Representations 430 contain media data that can be rendered to create a part of a multi-media presentation. In the video context, representations 430 in the same adaptation set 420 may contain the same video at different resolutions. Hence, such representations 430 can be used interchangeably depending on the desired video quality. In the audio context, representations 430 in a common adaptation set 420 may contain audio of varying quality as well as audio tracks in different languages. A representation 430 in an adaptation set 420 can also contain metadata, which can act as a hint track. Such a representation 430 is known as a timed metadata representation 431. Hence, a timed metadata representation 431 containing the time metadata can be used in conjunction with a corresponding video representation 430, an audio representation 430, a closed caption representation 430, etc. to determine how media representations 430 should be rendered. For example, the timed metadata representation 431 may indicate a preferred viewpoint 450 and a preferred viewport from the viewpoint 450 over time. Hence, a timed metadata representation 431 may indicate which adaptation sets should be obtained and rendered as the media presentation progresses.

Representations 430 may contain segments 440. A segment 440 contains media data for a predetermined time period (e.g., three seconds). Accordingly, a segment 440 may contain a portion of audio data, a portion of video data, etc. that can be accessed by a predetermined universal resource locator (URL) over a network. The MPD 400 contains data indicating the URL for each segment 440. Accordingly, a client can select the desired preselection 460 and/or viewpoint 450 to determine the adaptation set(s) 420 that should be rendered. The client can then determine the representations 430 that should be obtained based on current network congestion. The client can then request the corresponding segments 440 in order to render the media presentation for the user.

In DASH, associated representations 430 can be described by a representation 430 syntax element that contains an association ID (@associationId) attribute and optionally an association type (@associationType) attribute. Associated representations 430 are representations 430 that provide information on their relationships with other representations 430. The segments 440 of an associated representation 430 may be optional for decoding and/or presentation of the representations 430 identified by @associationId. Such segments 440 can be considered as supplementary or descriptive information, the type of the association being specified by the @associationType attribute. It should be noted that @associationId and @associationType attributes are used between representations 430 that are not in the same adaptation sets 420 (e.g., in different adaptation sets 420). As shown above, a timed metadata representation 431 is potentially related to every other representation 430 in the MPD 400. When multiple viewpoints 450 are employed the number of representations 430 may be large. In this case, syntax indicating a representation 430 to representation 430 association may employ a large amount of data to indicate a timed metadata representation 431 association with each other representation 430. Specifically, in a representation 430 to representation 430 example, the @associationId attribute would contain the values of the identifier (@id) attributes of all the representations 430.

The present disclosure employs various example signaling mechanisms to overcome this issue and efficiently signal associations between representations. In a first example embodiment the @associationId attribute may contain the @id attribute of an adaptation set 420 (e.g., AdaptationSet@id). When a particular value of AdaptationSet@id is contained in the @associationId attribute, the AdaptationSet@id value should be unique among the values of the @id attribute of all adaptation sets 420 and all representations 430 in the MPD 400. An optional adaptation set 420 level attribute may be added for indicating whether such uniqueness of the value of AdaptationSet@id for an adaptation set 420 is satisfied. The first example embodiment may be implemented as follows.

In this embodiment, associated representations 430, @associationId and @associationType attributes are specified as follows. Associated representations 430 are described by a representation 430 element that contains an @associationId attribute and optionally an @associationType attribute. Associated representations 430 are representations 430 that provide information on their relationships with other representations 430 or adaptation sets 420. The segments 440 of an associated representation 430 may be optional for decoding and/or presentation of the representations 430 or adaptation sets 420 identified by @associationId. They can be considered as supplementary or descriptive information, the type of the association being specified by the @associationType attribute. It should be noted that, in this embodiment, @associationId and @associationType attributes can only be used between representations 430 that are not in the same adaptation set 420. The @associationId attribute and @associationType attribute may be defined by Table 1:

TABLE 1

| | | |
|---|---|---|
| @associationId | O | specifies all Representations or Adaptation Sets the Representation is associated with in the decoding and/or presentation process as a whitespace-separated list of values of Representation@id or AdaptationSet@id attributes. When an AdaptationSet@id value is contained in an @associationId attribute, the AdaptationSet@id value shall be unique among the values of the @id attribute of all Adaptation Sets and all Representations in the MPD. |
| @associationType | O | specifies, as a whitespace separated list of values, the kind of association for each Representation or Adaptation Set the Representation has been associated with through the @associationId attribute. Values taken by this attribute are 4 character codes for track reference types registered in MP4 registration authority. This attribute shall not be present when @associationId is not present. When present, this attribute must have as many values as the number of identifiers declared in the @associationId attribute. |

In this embodiment, carriage of timed metadata track, also known as a timed metadata representation 431, for OMAF is specified as follows. A timed metadata track (e.g., of track sample entry type 'invo' or 'rcvp') may be encapsulated in a DASH representation 430. The @associationId attribute of this metadata representation 430 may contain the values of the attribute @id of the representations 430 or adaptation sets 420 containing omnidirectional media carried by media track(s) that are associated with the timed metadata track. The @associationType attribute of this metadata representation 430 may be set equal to 'cdsc'.

In this embodiment, an optional adaptation set level attribute may be specified in Table 2.

TABLE 2

| | | |
|---|---|---|
| @idUniqueFlag | OD default: false | When this flag is set to 'true', the value of the @id attribute of this Adaptation Set shall be unique among the values of the @id attribute of all Adaptation Sets and all Representations in the MPD. When this flag is set to 'false', the above constraint may or may not apply. |

The ID unique flag (@idUniqueFlag) attribute provides a mechanism for indicating whether the value of AdaptationSet@id is unique for an adaptation set 420.

In a second example embodiment a representation level attribute, which may be denoted as an association by adaptation set ID (@associationAsId), is defined to associate a containing representation 430 to one or more adaptation sets 420. In this embodiment, associated representations 430, @associationId, associationAsId, and @associationType attributes are specified as follows. Associated representations 430 are described by a representation 430 element that contains an @associationId or associationAsId attribute and optionally an @associationType attribute. Associated representations 430 are representations 430 that provide information on their relationships with other representations 430 or adaptation sets 420. The segments 440 of an associated representation 430 may be optional for decoding and/or presentation of the representations 430 or adaptation sets 420 identified by @associationId or associationAsId. The segments 440 can be considered as supplementary or descriptive information, the type of the association being specified by the @associationType attribute. It should be noted that @associationId or @associationAsId and @associationType attributes may only be used between representations 430 that are not in the same adaptation set 420. The @associationId attribute, @associationAsId attribute and @associationType attribute may be defined in Table 3:

TABLE 3

| | | |
|---|---|---|
| @associationId | O | specifies all Representations the Representation is associated with in the decoding and/or presentation process as a whitespace-separated list of values of Representation@id attributes. |
| @associationAsId | O | specifies all Adaptation Sets the Representation is associated with in the decoding and/or presentation process as a whitespace-separated list of values of AdaptationSet@id attributes. |
| @associationType | O | specifies, as a whitespace separated list of values, the kind of association for each Representation or Adaptation Set the Representation has been associated with through the @associationId or @associationAsId attribute, respectively. Values taken by this attribute are 4 character codes for track reference types registered in MP4 registration authority. This attribute shall not be present when @associationId is not present. When present, this attribute must have as many values as the number of identifiers declared in the @associationId attribute. |

In this embodiment, carriage of timed metadata track for OMAF can be specified as follows. A timed metadata track (e.g., of track sample entry type 'invo' or 'rcvp') may be encapsulated in a DASH representation 430. The @associationId or @associationAsId attribute of this metadata representation 430 shall contain the values of the attribute @id of the representations 430 or adaptation sets 420, respectively, containing the omnidirectional media carried by the media track(s) that are associated with the timed metadata track. The @associationType attribute of this metadata representation may be set equal to 'cdsc'. This embodiment may also employ a @idUniqueFlag attribute as discussed in the first embodiment.

The first two example embodiments allow representation 430 attributes to associate to adaptation sets 420, which can be employed to allow an entire adaptation set 430 to associate with a representation 430 containing a timed metadata track. In this way, timed metadata track can refer to entire video track groups rather than to each and every representation 430, which significantly reduces MPD 400 file size.

A third example embodiment is substantially similar to the first example embodiment, but allows a representation 430 to associate with an entire viewpoint 450. In this embodiment, the @associationId attribute may contain the value of a viewpoint 450 ID. When a particular viewpoint 450 ID value is contained in the @associationId attribute, the viewpoint 450 ID value should be distinct from the value of the @id attributes of any representation 430 in the MPD 400. A field may be included in a Viewpoint@value attribute for indicating whether such uniqueness of the viewpoint 450 ID value is satisfied. The other values may be as described in the first example embodiment with mentions of adaptation set 420 exchanged with viewpoint 450.

A fourth example embodiment is substantially similar to the second example embodiment, but provides a representation level attribute, which may be denoted as an association by viewpoint ID (@associationVwptId), defined to associate a containing representation 430 to one or more viewpoints 450. The other values may be as described in the second example embodiment with mentions of adaptation set 420 exchanged with viewpoint 450.

A fifth example embodiment is substantially similar to the first example embodiment, but allows a representation 430 to associate with a preselection 460. In this embodiment, the @associationId attribute may contain the @id attribute of a preselection 460 (e.g., Preselection@id). When a particular preselection 460 ID value is contained in the @associationId attribute, the preselection 460 ID value should be distinct from the value of the @id attributes of any representation 430 in the MPD 400. An optional attribute may be added to an extensible markup language (XML) schema of the preselection 460 element for indicating whether such uniqueness of the value of Preselection@id for a preselection 460 is satisfied. The other values may be as described in the first example embodiment with mentions of adaptation set 420 exchanged with preselection 460.

A sixth example embodiment is substantially similar to the second example embodiment, but provides a representation level attribute, which may be denoted as an association by preselection 460 ID (@associationPsId), defined to associate a containing representation 430 to one or more preselection 460. The other values may be as described in the second example embodiment with mentions of adaptation set 420 exchanged with preselection 460.

In a seventh example embodiment, the attributes of example embodiments one, two, three, four, five, and/or six are implemented as attributes at other levels of the MPD 400. Specifically, the @associationId, the @associationAsId, the @associationPsId, and/or the @associationVwptId, as discussed above, can be implemented as attribute(s) of an adaptation set 420, a preselection 460, and/or a viewpoint 450. This allows adaptation sets 420, preselections 460, and/or viewpoints 450 to associate with other DASH objects, such as other adaptation sets 420, preselections 460, and/or viewpoints 450.

With any of the above approaches (example embodiments one through seven), an efficient signaling of the associated representations 430, adaptation sets 420, preselections 460, or viewpoints 450 for a representation 430 (e.g., a timed metadata representation 430) or some other DASH object can be achieved, without significantly increasing the size of the MPD 400.

A specific example implementation is as follows. A timed metadata representation may be associated with one or more media representations through collective association. A timed metadata representation may be collectively associated with all media representations of a sub-picture composition as follows. An association descriptor is present as a child element of the DASH Representation element of the timed metadata representation. The association descriptor should include one string in the association element of the type AdaptationSet [SubPicCompositionId="aa"], where "aa" indicates a sub-picture composition identifier value. Further, 'cdtg' can be included as the value of an Association@associationKindList attribute of the association element. Specifically, a timed metadata track containing a 'cdtg' track reference describes the referenced media tracks and track groups collectively. The 'cdtg' track reference may only be present in timed metadata tracks.

Further, as noted above, some systems may have difficulty determining if two viewpoints 450 are in fact the same viewpoint 450 as some viewpoints 450 can move over the course of a video resulting in changes to corresponding position information. The following may address this issue. In an either example embodiment, when two viewpoint 450 elements both have a @value attribute containing the same value of viewpoint 450 ID, then the @value attributes of the two viewpoint 450 elements can be considered as equivalent regardless of position information. With this, a system can determine whether multiple DASH objects (e.g., adaptation sets 420) that contain an instance of a viewpoint 450 element can be considered as belonging to the same viewpoint 450, and thus avoid erroneously switching viewpoints 450 when not needed or vice versa.

Figure 5:
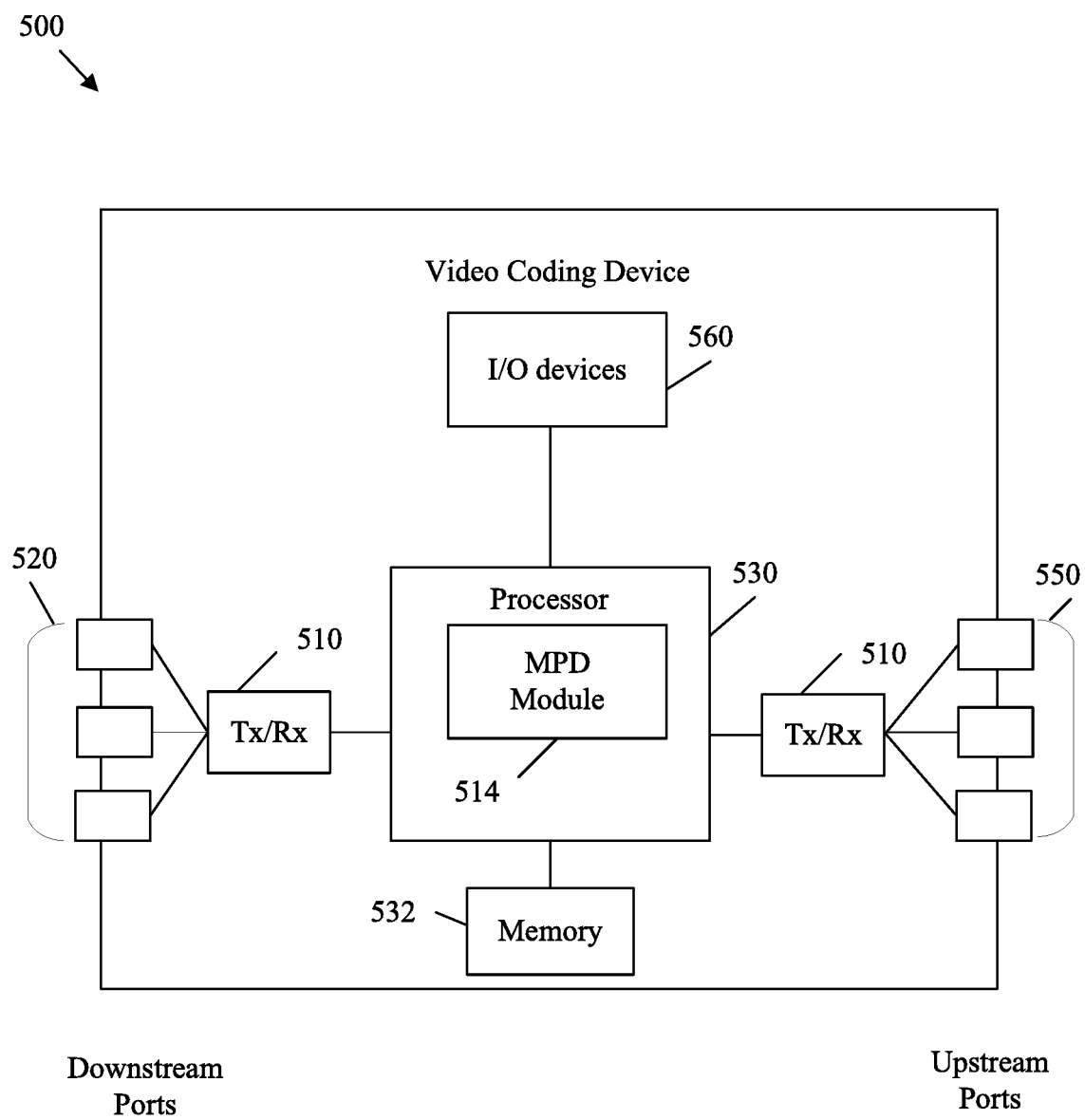
FIG. 5 is a schematic diagram illustrating an example video coding device.

FIG. 5 is a schematic diagram illustrating an example video coding device 500. The video coding device 500 is suitable for implementing the disclosed examples/embodiments as described herein. The video coding device 500 comprises downstream ports 520, upstream ports 550, and/or transceiver units (Tx/Rx) 510, including transmitters and/or receivers for communicating data upstream and/or downstream over a network. The video coding device 500 also includes a processor 530 including a logic unit and/or central processing unit (CPU) to process the data and a memory 532 for storing the data. The video coding device 500 may also comprise optical-to-electrical (OE) components, electrical-to-optical (EO) components, and/or wireless communication components coupled to the upstream ports 550 and/or downstream ports 520 for communication of data via optical or wireless communication networks. The video coding device 500 may also include input and/or output (I/O) devices 560 for communicating data to and from a user. The I/O devices 560 may include output devices such as a display for displaying video data, speakers for outputting audio data, etc. The I/O devices 560 may also include input devices, such as a keyboard, mouse, trackball, etc., and/or corresponding interfaces for interacting with such output devices.

The processor 530 is implemented by hardware and software. The processor 530 may be implemented as one or more CPU chips, cores (e.g., as a multi-core processor), field-programmable gate arrays (FPGAs), application specific integrated circuits (ASICs), and digital signal processors (DSPs). The processor 530 is in communication with the downstream ports 520, Tx/Rx 510, upstream ports 550, and memory 532. The processor 530 comprises a MPD module 514. The MPD module 514 may implement all or part of the disclosed embodiments described above. For example, the MPD module 514 can be employed to implement the functionality of a video coding device 104, an encoder 103, a DASH content server 111, a client 108, and/or a decoder 107, depending on the example. For example, the MPD module 514 can implement relevant portions of method 200. As another example, the MPD module 514 can receive VR video (e.g., omnidirectional video) from cameras 301, 302, and/or 303 and generate an MPD 400 to support streaming of multi-viewpoint VR video via a DASH streaming system. Further, MPD module 514 can encode an MPD with syntax associating a representation, an adaptation set, a viewpoint, and/or a preselection with another representation, adaptation set, viewpoint, and/or preselection, for example to associate a DASH object with a timed metadata track without encoding an association for every single representation. This reduces the file size of the MPD, reduces the processing resources to generate and/or process the MPD, reduces the network resources to transmit the MPD, and/or reduces the memory resources to store the MPD. As such, MPD module 514 improves the functionality of the video coding device 500 as well as addresses problems that are specific to the video coding arts. Further, MPD module 514 effects a transformation of the video coding device 500 to a different state. Alternatively, the MPD module 514 can be implemented as instructions stored in the memory 532 and executed by the processor 530 (e.g., as a computer program product stored on a non-transitory medium).

The memory 532 comprises one or more memory types such as disks, tape drives, solid-state drives, read only memory (ROM), random access memory (RAM), flash memory, ternary content-addressable memory (TCAM), static random-access memory (SRAM), etc. The memory 532 may be used as an over-flow data storage device, to store programs when such programs are selected for execution, and to store instructions and data that are read during program execution.

Figure 6:
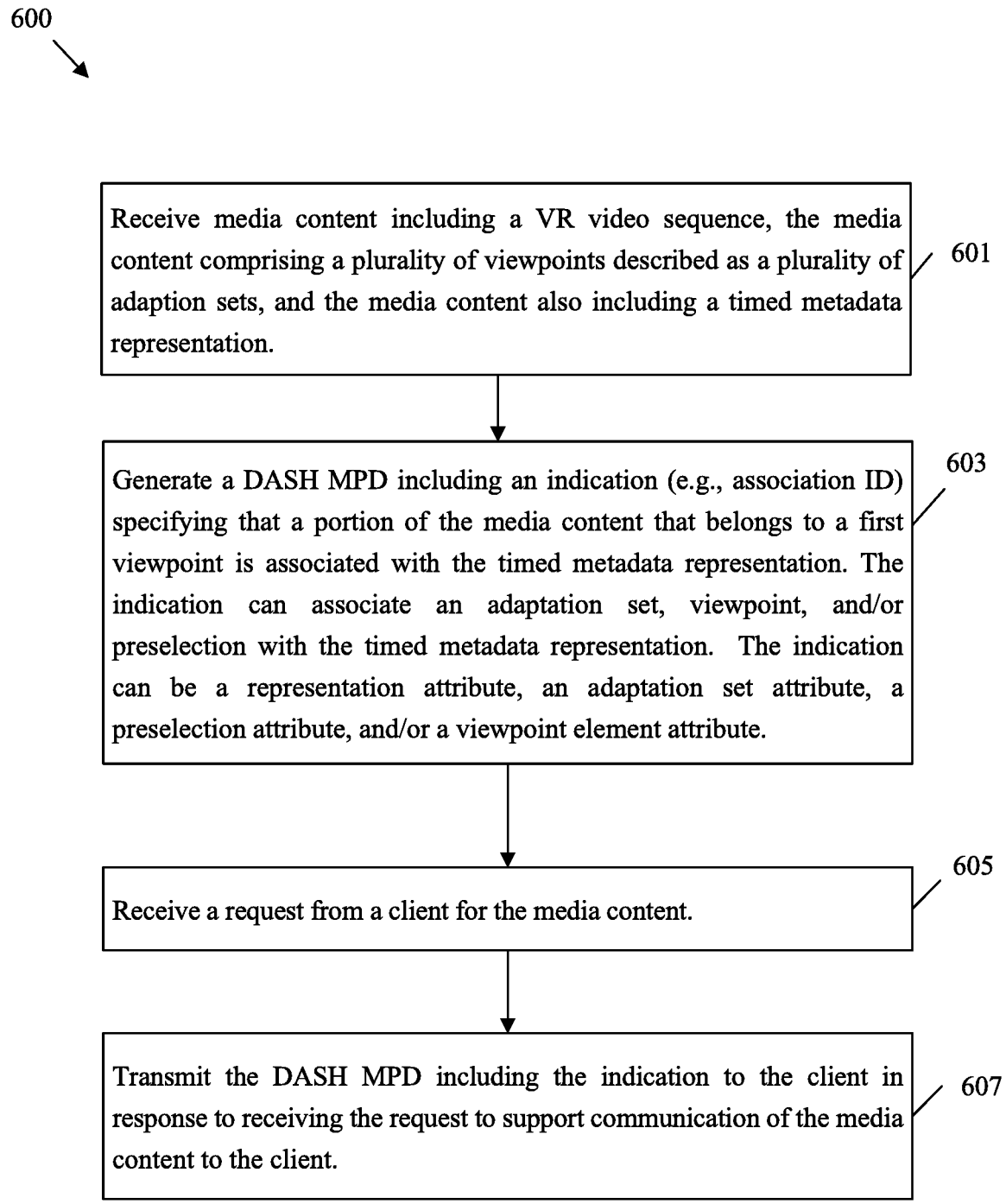
FIG. 6 is a flowchart of an example method of associating DASH objects in an MPD at a DASH content server to support streaming of VR video with multiple viewpoints.

FIG. 6 is a flowchart of an example method 600 of associating DASH objects in an MPD, such as MPD 400 and/or MPD 125, at a DASH content server to support streaming of VR video with multiple viewpoints, for example from a system 300. Hence, method 600 can be employed by a MPD module 514 and used in conjunction with method 200 to support distribution of multi-viewpoint VR media content by an encoder and/or a DASH content server, such as encoder 103 and/or DASH content server 111, respectively, in system 100.

At step 601, media content is received, for example at a DASH content server and from an encoder. The media content can include a VR video sequence comprising a plurality of viewpoints. The media content can be described as a plurality of adaptation sets which include various representations including segments. The adaptation sets for the media content can also be grouped into preselections. Further, the media content can include one or more timed metadata representations, such as hint tracks.

At step 603, a DASH MPD is generated for the media content. The MPD includes an indication specifying that a portion of the media content that belongs to the first viewpoint is associated with the timed metadata representation. The indication may include an association ID for indicating the relationships between the various DASH objects. As noted above, the association can be implemented by employing several mechanisms.

In one example, the association ID can be a representation attribute that may include an @associationVwptId attribute. In another example, the Association ID can be an adaptation set attribute including an @associationVwptId attribute. In another example, the Association ID can be a preselection attribute including an @associationVwptId attribute. In another example, the Association ID can be a viewpoint element attribute including an @associationVwptId attribute.

In another example, the association ID can be an @associationId attribute implemented as a representation attribute, an adaptation set attribute, a preselection attribute, a viewpoint element attribute, or combinations thereof. Further, the portion of the media content and/or the corresponding DASH object can include an attribute indicating that the Association ID references a unique ID attribute amongst IDs for the plurality of adaptation sets in the media content and IDs for representations associated with the plurality of adaptation sets.

In another example, the association ID can be a representation attribute including an @associationAsId attribute. In another example, the Association ID can be an adaptation set attribute including an @associationAsId attribute. In another example, the Association ID can be a preselection attribute including an @associationAsId attribute. In another example, the Association ID can be a viewpoint element attribute including an @associationAsId attribute.

In another example, the association ID can be a representation attribute including an @associationPsId attribute. In another example, the Association ID can be an adaptation set attribute including an @associationPsId attribute. In another example, the Association ID can be a preselection attribute including an @associationPsId attribute. In another example, the Association ID can be a viewpoint element attribute including an @associationPsId attribute.

Regardless of the particular example, the indication can associate an adaptation set, a viewpoint, and/or a preselection with a timed metadata representation, and can hence allow groups of representations to be associated with another DASH object via a single attribute.

At step 605, a request for the media content can be received from a client, for example as an HTTP GET request. The DASH MPD including the indication can be transmitted to the client at step 607 in response to receiving the request in order to support communication of the media content to the client.

Figure 7:
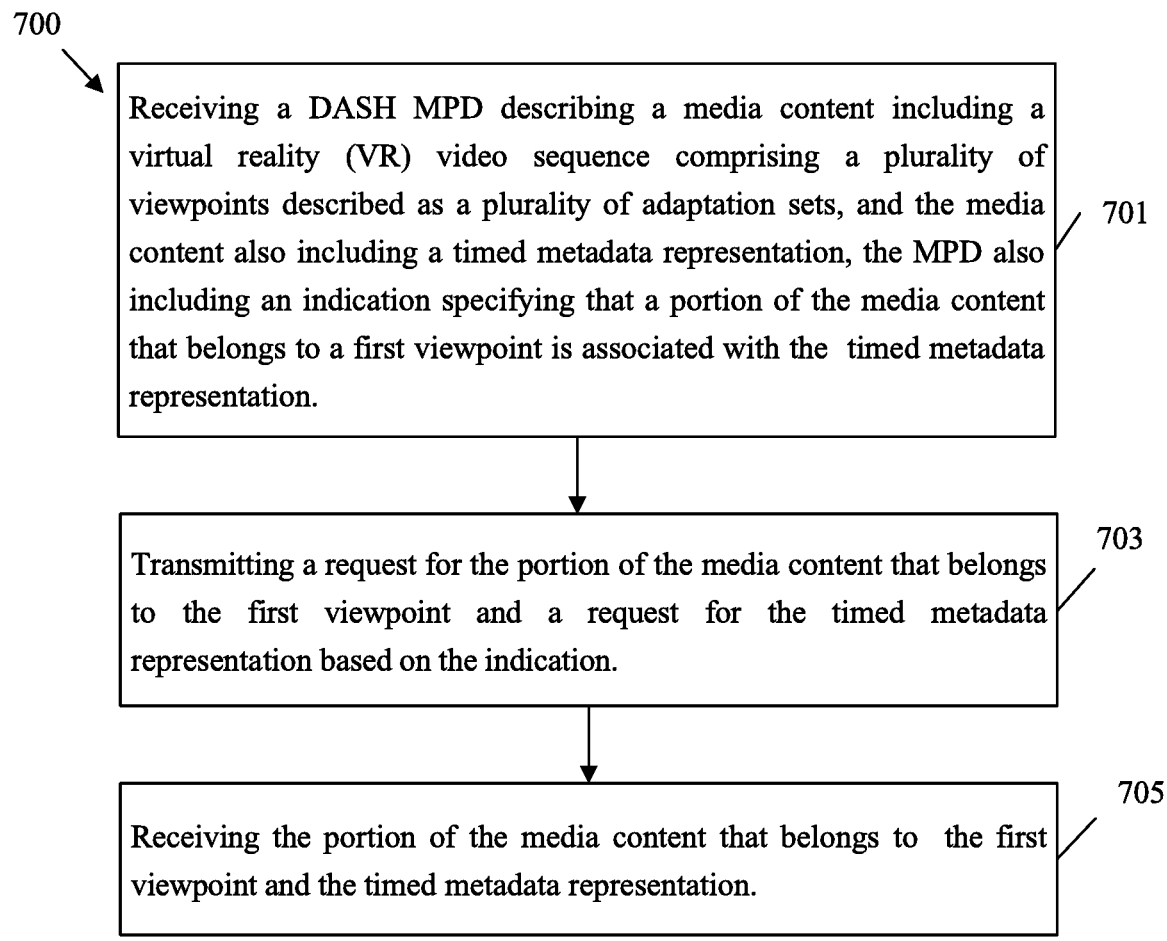
FIG. 7 is a flowchart of an example method of employing an association of DASH objects in an MPD at a DASH client to support streaming of VR video with multiple viewpoints.

FIG. 7 is a flowchart of an example method 700 of employing an association of DASH objects in an MPD, such as MPD 400 and/or MPD 125, at a DASH client to support streaming of VR video with multiple viewpoints, for example from a system 300. Hence, method 600 can be employed by a MPD module 514 and used in conjunction with method 200 to support streaming DASH based media content at a client, such as client 108 in system 100.

At step 701, DASH MPD is received. The MPD describes media content including a VR video sequence comprising a plurality of viewpoints described as a plurality of adaptation sets. The media content also includes one or more timed metadata representations. Further, the MPD also including an indication specifying that a portion of the media content that belongs to a first viewpoint is associated with the timed metadata representation. The portion may be an adaptation set, a viewpoint, and/or a preselection. Further, the indication can be an association ID.

At step 703, a request is transmitted for the portion of the media content that belongs to the first viewpoint. A request is also transmitted for the timed metadata representation based on the indication.

At step 705, the portion of the media content that belongs to the first viewpoint and the timed metadata representation are both received. The DASH client can then employ both the timed metadata representation and the media content related to the first viewpoint to display the VR video on a rendering device.

Figure 8:
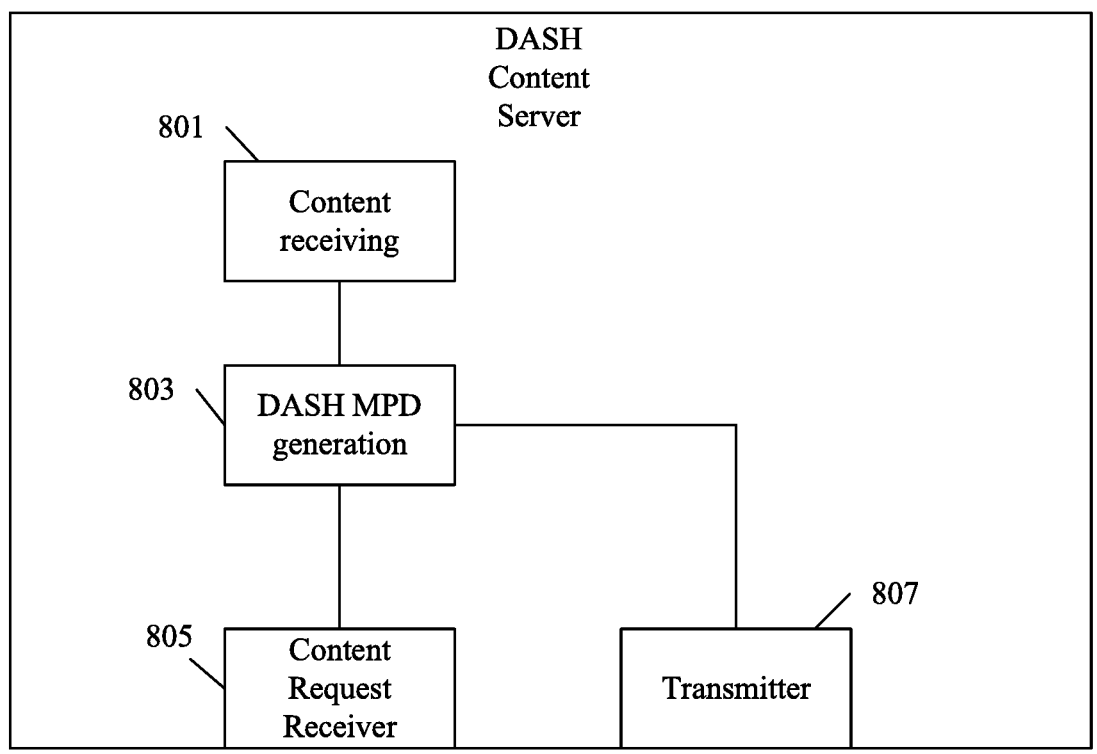
FIG. 8 is a schematic diagram of an example DASH content server for associating DASH objects in an MPD to support streaming of VR video with multiple viewpoints.

FIG. 8 is a schematic diagram of an example DASH content server 800 for associating DASH objects in an MPD, such as MPD 400 and/or MPD 125, to support streaming of VR video with multiple viewpoints, for example from a system 300. Hence, DASH content server 800 can be used in conjunction with method 200 and/or in conjunction with a MPD module 514, to support distribution of multi-viewpoint VR media content by an encoder and/or a DASH content server, such as encoder 103 and/or DASH content server 111, respectively, in system 100.

The DASH content server 800 can include a content receiving module 801 for receiving media content including a VR video sequence, the media content described as a plurality of adaptation sets, the plurality of adaptation sets belonging to a plurality of viewpoints, and the media content also including a timed metadata representation. The DASH content server 800 can also include a DASH MPD generation module 803 for generating a DASH MPD including an indication specifying that a portion of the media content that belongs to a first viewpoint is associated with the timed metadata representation. The DASH content server 800 can also include a request receiving module 805 for receiving a request from a client for the media content. The DASH content server 800 can also include a transmitter 807 for transmitting the DASH MPD including the indication to the client in response to receiving the request to support communication of the media content to the client.

Figure 9:
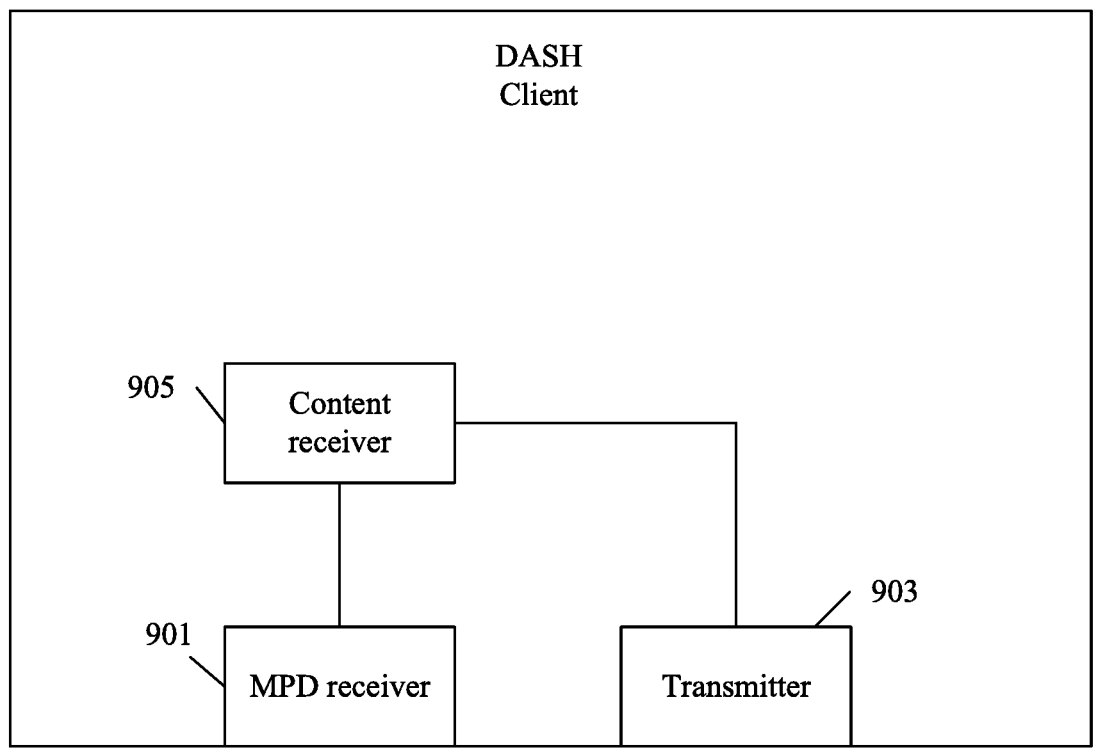
FIG. 9 is a schematic diagram of an example DASH client for associating DASH objects in an MPD to support streaming of VR video with multiple viewpoints.

FIG. 9 is a schematic diagram of an example DASH client 900 for associating DASH objects in an MPD, such as MPD 400 and/or MPD 125, to support streaming of VR video with multiple viewpoints, for example from a system 300. Hence, DASH client 900 can be used in conjunction with method 200 and/or in conjunction with a MPD module 514, to support streaming DASH based media content at a client, such as client 108 in system 100.

The DASH client 900 can include a MPD receiving module 901 for receiving a DASH MPD, the MPD describing a media content including a VR video sequence as a plurality of adaptation sets, the plurality of adaptation sets belonging to a plurality of viewpoints, and the media content also including a timed metadata representation, the MPD also including an indication specifying that a portion of the media content that belongs to a first viewpoint is associated with the timed metadata representation. The DASH client 900 can also include a transmitting module 903 for transmitting a request for the portion of the media content that belongs to the first viewpoint and a request for the timed metadata representation based on the indication. The DASH client 900 can also include a media content receiving module 905 for receiving the portion of the media content that belongs to the first viewpoint and the timed metadata representation.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascer-

What is claimed is:

1. A method implemented by a Dynamic Adaptive Streaming over Hypertext Transfer Protocol (HTTP) (DASH) server, the method comprising:
receiving media content including a virtual reality (VR) video sequence at a viewpoint and a timed metadata representation, wherein the timed metadata representation comprises recommended viewport timed metadata;
generating a DASH Media Presentation Description (MPD) including an indication specifying that the timed metadata representation is collectively associated with one or more media representations of the viewpoint, wherein the indication is an association descriptor that includes a viewpoint identifier (ID) of the viewpoint in an association element of a type AdaptationSet and that collectively associates the timed metadata representation with the media representations, and wherein the viewpoint ID is one value contained in an @value attribute;
receiving a request from a client for the media content; and
transmitting the DASH MPD including the indication to the client in response to receiving the request to support communication of the media content to the client.

2. The method of claim 1, wherein the indication further comprises an association ID that is a representation attribute that associates a list of one or more adaptation sets of the media content to the timed metadata representation.

3. The method of claim 1, wherein the indication further comprises an association ID that is a representation attribute that associates a list of one or more viewpoints to the timed metadata representation.

4. The method of claim 1, wherein the indication further comprises an association ID that is a representation attribute that associates a list of one or more preselections of the media content to the timed metadata representation.

5. The method of claim 1, wherein the indication further comprises an association ID that is a representation attribute, an adaptation set attribute, a preselection attribute, a viewpoint element attribute, or combinations thereof.

6. The method of claim 1, wherein the indication further comprises an association ID that is an attribute indicating that the association ID references a unique ID attribute amongst IDs for a plurality of adaptation sets describing the media content and IDs for representations associated with the plurality of adaptation sets.

7. A method implemented by a Dynamic Adaptive Streaming over Hypertext Transfer Protocol (HTTP) (DASH) client, the method comprising:
receiving a DASH Media Presentation Description (MPD), the MPD describing a media content including a virtual reality (VR) video sequence at a viewpoint, and the media content also including a timed metadata representation, wherein the timed metadata representation comprises recommended viewport timed metadata, the MPD also including an indication specifying that the timed metadata representation is collectively associated with one or more media representations of the viewpoint, and wherein the indication comprises an association descriptor that includes a viewpoint identifier (ID) of the viewpoint in an association element of a type AdaptationSet and that collectively associates the timed metadata representation with the media representations, and wherein the viewpoint ID is one value contained in an @value attribute;
transmitting a request for the media content related to the viewpoint and a request for the timed metadata representation based on the indication; and
receiving the media content related to the viewpoint and the timed metadata representation.

8. The method of claim 7, wherein the indication further comprises an association ID that is a representation attribute that associates a list of one or more adaptation sets of the media content to the timed metadata representation.

9. The method of claim 7, wherein the indication further comprises an association ID that is a representation attribute that associates a list of one or more viewpoints to the timed metadata representation.

10. The method of claim 7, wherein the indication further comprises an association ID that is a representation attribute that associates a list of one or more preselections of the media content to the timed metadata representation.

11. The method of claim 7, wherein the indication further comprises an association ID that is a representation attribute, an adaptation set attribute, a preselection attribute, a viewpoint element attribute, or combinations thereof.

12. The method of claim 7, wherein the indication further comprises an association ID that is an attribute indicating that the association ID references a unique ID attribute amongst IDs for a plurality of adaptation sets describing the media content and IDs for representations associated with the plurality of adaptation sets.

13. A method implemented by a Dynamic Adaptive Streaming over Hypertext Transfer Protocol (HTTP) (DASH) server, the method comprising:
generating a DASH Media Presentation Description (MPD), wherein a timed metadata representation of the MPD comprises recommended viewport timed metadata, wherein an association descriptor of the MPD is in an element of the timed metadata representation and includes a viewpoint identifier (ID) of a viewpoint in an association element of a type AdaptationSet, wherein the viewpoint ID collectively associates the timed metadata representation with all media representations of the viewpoint in the DASH MPD, and wherein the viewpoint ID is one value contained in an @value attribute; and
providing the DASH MPD to a client.

14. The method of claim 13, wherein the association descriptor is present as a child element of a DASH Representation element of the timed metadata representation.

15. The method of claim 14, wherein the association element includes an attribute of Association@associationKindList.

16. The method of claim 15, wherein a value of the Association@associationKindList includes 'cdtg'.

17. The method of claim 16, wherein cdtg is a track reference that describes referenced media tracks and track groups collectively.

18. The method of claim 1, wherein the viewpoint ID is expressed as an association by viewpoint ID (@associationVwptId) attribute.

19. The method of claim 7, wherein the viewpoint ID is expressed as an association by viewpoint ID (@associationVwptId) attribute.

* * * * *